United States Patent
Soltani Zarrin et al.

(10) Patent No.: US 12,097,614 B2
(45) Date of Patent: Sep. 24, 2024

(54) OBJECT MANIPULATION

(71) Applicant: Honda Motor Co., Ltd., Tokyo (JP)

(72) Inventors: Rana Soltani Zarrin, Los Gatos, CA (US); Katsu Yamane, Mountain View, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 315 days.

(21) Appl. No.: 17/539,989

(22) Filed: Dec. 1, 2021

(65) Prior Publication Data

US 2023/0080768 A1    Mar. 16, 2023

Related U.S. Application Data

(60) Provisional application No. 63/242,899, filed on Sep. 10, 2021.

(51) Int. Cl.
*B25J 9/16* (2006.01)

(52) U.S. Cl.
CPC .......... *B25J 9/1612* (2013.01); *B25J 9/163* (2013.01); *B25J 9/1664* (2013.01); *G05B 2219/32335* (2013.01); *G05B 2219/39001* (2013.01)

(58) Field of Classification Search
CPC ........ B25J 9/1612; B25J 9/163; B25J 9/1664; G05B 2219/32335; G05B 2219/39001
See application file for complete search history.

(56) References Cited

U.S. PATENT DOCUMENTS

| | | | |
|---|---|---|---|
| 9,981,382 B1 * | 5/2018 | Strauss | B25J 9/1697 |
| 10,131,051 B1 * | 11/2018 | Goyal | B25J 9/1697 |
| 2019/0184560 A1 * | 6/2019 | Liu | B25J 9/1605 |
| 2020/0055152 A1 * | 2/2020 | Chavan Dafle | G01B 5/241 |
| 2020/0101603 A1 * | 4/2020 | Satou | G05B 13/024 |
| 2020/0198140 A1 * | 6/2020 | Dupuis | G06F 17/18 |
| 2021/0049501 A1 | 2/2021 | Kalabic et al. | |
| 2021/0122045 A1 * | 4/2021 | Handa | G06T 7/74 |
| 2021/0146532 A1 * | 5/2021 | Rodriguez Garcia | B25J 9/1669 |

(Continued)

OTHER PUBLICATIONS

K. Hang et al., "Hierarchical Fingertip Space: A Unified Framework for Grasp Planning and In-Hand Grasp Adaptation," IEEE Transactions on Robotics, 2016.

(Continued)

*Primary Examiner* — Jaime Figueroa
*Assistant Examiner* — Mohamad O El Sayah
(74) *Attorney, Agent, or Firm* — RANKIN, HILL & CLARK LLP

(57) ABSTRACT

A robot for object manipulation may include sensors, a robot appendage, actuators configured to drive joints of the robot appendage, a planner, and a controller. Object path planning may include determining poses. Object trajectory optimization may include assigning a set of timestamps to the poses, optimizing a cost function based on an inverse kinematic (IK) error, a difference between an estimated required wrench and an actual wrench, and a grasp efficiency, and generating a reference object trajectory based on the optimized cost function. Grasp sequence planning may be model-based or deep reinforcement learning (DRL) policy based. The controller may implement the reference object trajectory and the grasp sequence via the robot appendage and actuators.

20 Claims, 7 Drawing Sheets

(56) References Cited

U.S. PATENT DOCUMENTS

| | | |
|---|---|---|
| 2021/0316509 A1 | 10/2021 | Malhan et al. |
| 2021/0370507 A1* | 12/2021 | Corcodel ............... B25J 9/1664 |
| 2022/0009091 A1 | 1/2022 | Moreno Noguer et al. |

OTHER PUBLICATIONS

L Han and J.C. Trinkle, Object Reorientation with Finger Gaiting, International Multiconference: Computational Engineering In Systems Applications, 1998.

J. Shi, H. Weng and K. M. Lynch, "In-Hand Sliding Regrasp With Spring-Sliding Compliance and External Constraints," IEEE Access, 2020.

J. Xu, Y. Lou and Z. Li, "Hybrid Automaton: A Better Model of Finger Gaits," IEEE/RSJ International Conference on Intelligent Robots and Systems, 2006.

S. Abondance, C. B. Teeple, and R. J. Wood, "A dexterous soft robotic hand for delicate in-hand manipulation," IEEE Robotics and Automation Letters, vol. 5, No. 4, pp. 5502-5509, 2020.

Z. Ahmed, N. Le Roux, M. Norouzi, and D. Schuurmans, "Understanding the impact of entropy on policy optimization," in International Conference on Machine Learning. PMLR, 2019, pp. 151-160.

ALGLIB Project, "ALGLIB—C++/C# numerical analysis library," https://www.alglib.net/.

O. M. Andrychowicz, B. Baker, M. Chociej, R. Jozefowicz, B. Mc-Grew, J. Pachocki, A. Petron, M. Plappert, G. Powell, A. Ray, et al., "Learning dexterous in-hand manipulation," The International Journal of Robotics Research, vol. 39, No. 1, pp. 3-20, 2020.

J. Bohg, A. Morales, T. Asfour, and D. Kragic, "Data-driven grasp synthesis—a survey," IEEE Transactions on Robotics, vol. 30, No. 2, pp. 289-309, 2013.

N. Chavan-Dafle and A. Rodriguez, "Prehensile pushing: In-hand manipulation with push-primitives," in 2015 IEEE/RSJ International Conference on Intelligent Robots and Systems (IROS). IEEE, 2015, pp. 6215-6222.

N. C. Dafle, A. Rodriguez, R. Paolini, B. Tang, S. S. Srinivasa, M. Erdmann, M. T. Mason, I. Lundberg, H. Staab, and T. Fuhlbrigge, "Extrinsic dexterity: In-hand manipulation with external forces," in 2014 IEEE International Conference on Robotics and Automation (ICRA). IEEE, 2014, pp. 1578-1585.

Y. Fan, T. Tang, H.-C. Lin, Y. Zhao, and M. Tomizuka, "Real-time robust finger gaits planning under object shape and dynamics uncertainties," in 2017 IEEE/RSJ International Conference on Intelligent Robots and Systems (IROS). IEEE, 2017, pp. 1267-1273.

T. Feix, J. Romero, H.-B. Schmiedmayer, A. M. Dollar, and D. Kragic, "The grasp taxonomy of human grasp types," IEEE Transactions on human-machine systems, vol. 46, No. 1, pp. 66-77, 2015.

S. Guadarrama, A. Korattikara, O. Ramirez, P. Castro, E. Holly, S. Fishman, K. Wang, E. Gonina, N. Wu, E. Kokiopoulou, L. Sbaiz, J. Smith, G. Bartók, J. Berent, C. Harris, V. Vanhoucke, and E. Brevdo, "TF-Agents: A library for reinforcement learning in tensorflow," https://github.com/tensorflow/agents, 2018, [Online; accessed Jun. 25, 2019]. [Online]. Available: https://github.com/tensorflow/agents.

S. G. Johnson, "The NLopt nonlinear-optimization package," http://github.com/stevengj/nlopt.

S. Karaman and E. Frazzoli, "Sampling-based algorithms for optimal motion planning," International Journal of Robotics Research, vol. 30, No. 7, pp. 846-894, 2011.

Y. Karayiannidis, K. Pauwels, C. Smith, D. Kragic, et al., "In-hand manipulation using gravity and controlled slip," in 2015 IEEE/RSJ International Conference on Intelligent Robots and Systems (IROS). IEEE, 2015, pp. 5636-5641.

L. Kavraki, P. Svestka, J.-C. Latombe, and M. Overmars, "Probabilistic roadmaps for path planning in high-dimensional configuration spaces," IEEE Transactions on Robotics and Automation, vol. 12, pp. 566-580, 1996.

V. Kumar, E. Todorov, and S. Levine, "Optimal control with learned local models: Application to dexterous manipulation," in 2016 IEEE International Conference on Robotics and Automation (ICRA). IEEE, 2016, pp. 378-383.

T. Li, K. Srinivasan, M. Q. H. Meng, W. Yuan, and J. Bohg, "Learning hierarchical control for robust in-hand manipulation," in 2020 IEEE International Conference on Robotics and Automation (ICRA), 2020, pp. 8855-8862.

M. Liarokapis and A. M. Dollar, "Deriving dexterous, in-hand manipulation primitives for adaptive robot hands," in 2017 IEEE/RSJ International Conference on Intelligent Robots and Systems (IROS). IEEE, 2017, pp. 1951-1958.

C. K. Liu, "Dextrous manipulation from a grasping pose," in ACM SIGGRAPH 2009 papers, 2009, pp. 1-6.

I. Mordatch, Z. Popović, and E. Todorov, "Contact-invariant optimization for hand manipulation," in Proceedings of the ACM SIGGRAPH/Eurographics symposium on computer animation, 2012, pp. 137-144.

A. Nagabandi, K. Konolige, S. Levine, and V. Kumar, "Deep dynamics models for learning dexterous manipulation," in Conference on Robot Learning. PMLR, 2020, pp. 1101-1112.

A. Rajeswaran, V. Kumar, A. Gupta, G. Vezzani, J. Schulman, E. Todorov, and S. Levine, "Learning complex dexterous manipulation with deep reinforcement learning and demonstrations," arXiv preprint arXiv:1709.10087, 2017.

J. Schulman, F. Wolski, P. Dhariwal, A. Radford, and O. Klimov, "Proximal policy optimization algorithms," arXiv preprint arXiv:1707.06347, 2017.

I. A. Şucan, M. Moll, and L. E. Kavraki, "The Open Motion Planning Library," IEEE Robotics & Automation Magazine, vol. 19, No. 4, pp. 72-82, Dec. 2012.

J. Tobin, R. Fong, A. Ray, J. Schneider, W. Zaremba, and P. Abbeel, "Domain randomization for transferring deep neural networks from simulation to the real world," in 2017 IEEE/RSJ international conference on intelligent robots and systems. IEEE, 2017, pp. 23-30.

E. Todorov, "A convex, smooth and invertible contact model for trajectory optimization," in 2011 IEEE International Conference on Robotics and Automation. IEEE, 2011, pp. 1071-1076.

J. Ueda, M. Kondo, and T. Ogasawara, "The multifingered naist hand system for robot in-hand manipulation," Mechanism and Machine Theory, vol. 45, No. 2, pp. 224-238, 2010.

H. Van Hoof, T. Hermans, G. Neumann, and J. Peters, "Learning robot in-hand manipulation with tactile features," in 2015 IEEE-RAS 15th International Conference on Humanoid Robots (Humanoids). IEEE, 2015, pp. 121-127.

M. W. Walker and D. E. Orin, "Efficient dynamic computer simulation of robotic mechanisms," 1982.

T. Hasegawa, H. Waita, and T. Kawakami, "A multi-degree-of-freedom hand with both dexterity and strength," in 2022 IEEE International Conference on Robotics and Automation, 2022 (under review).

Office Action of U.S. Appl. No. 17/677,268 dated May 28, 2024, 29 pages.

* cited by examiner

OBJECT MANIPULATION

CROSS-REFERENCE TO RELATED APPLICATIONS

This application claims the benefit of U.S. Provisional Patent Application Ser. No. 63/242,899 entitled "HYBRID MODEL AND LEARNING-BASED PLANNING AND CONTROL OF IN-HAND MANIPULATION", filed on Sep. 10, 2021; the entirety of the above-noted application(s) is incorporated by reference herein.

BACKGROUND

To use a tool or device, the tool may be held with a grasp that is different from a grasp for picking the tool up. To turn a nut using a wrench, for example, one may first pick up the wrench using one's fingertips and then pull the wrench closer to the palm while transitioning to a power grasp so that a larger force may be applied. It may thus be useful to change the grasp along with the object pose relative to one's hand between picking up and using the tool (e.g., in-hand manipulation).

BRIEF DESCRIPTION

According to one aspect, a system for object manipulation may include a planner and a controller. The planner may perform object path planning, appendage path planning, object trajectory optimization, appendage trajectory optimization, and grasp sequence planning. Object path planning may be performed to determine a first object pose, a second object pose, and an Nth object pose. Object trajectory optimization may include assigning a set of timestamps to the first object pose, the second object pose, and the Nth object pose, optimizing a cost function based on a first factor indicative of an inverse kinematic (IK) error, a second factor indicative of a difference between an estimated required wrench and an actual wrench, and a third factor indicative of a grasp efficiency, and generating a reference object trajectory based on the optimized cost function. Grasp sequence planning may include generating a grasp sequence by a first type of grasp sequence planning or a second type of grasp sequence planning. The first type of grasp sequence planning may be based on the optimized cost function and minimizing added contact points and/or removed contact points, provided that they have the same cost value. The second type of grasp sequence planning may be based on a deep reinforcement learning (DRL) policy trained based on a reward function. The reward function is based on a first term indicative of the IK error, a second term indicative of the difference between the estimated required wrench and the actual wrench, and a third term indicative of the grasp efficiency. The second type of grasp sequence planning may not require a final grasp to generate the grasp sequence. The controller may implement the reference object trajectory and the grasp sequence via a robot appendage and one or more actuators.

The planner may include an object path planner, an object trajectory optimizer, and a grasp sequence planner. The object path planner may perform the object path planning, the object trajectory optimizer may perform the object trajectory optimization, and the grasp sequence planner may perform the grasp sequence planning. The object path planner may receive an initial object position, a final object position, an initial object orientation, a final object orientation, and a set of grasp candidates. The object path planner may calculate a planned object trajectory based on the initial object position, the final object position, the initial object orientation, the final object orientation, and the set of grasp candidates. The object trajectory optimizer may receive the planned object trajectory and a set of grasp candidates. The object trajectory optimizer may calculate the reference object trajectory based on the planned object trajectory and the set of grasp candidates. The object path planning may be performed based on a Probabilistic Roadmap (PRM). The object trajectory optimization may be performed based on piecewise cubic B-splines.

According to one aspect, a method for object manipulation may include performing object path planning to determine a first object pose, a second object pose, and an Nth object pose, performing object trajectory optimization by assigning a set of timestamps to the first object pose, the second object pose, and the Nth object pose, optimizing a cost function based on a first factor indicative of an inverse kinematic (IK) error, a second factor indicative of a difference between an estimated required wrench and an actual wrench, and a third factor indicative of a grasp efficiency, and generating a reference object trajectory based on the optimized cost function. The method for object manipulation may include performing grasp sequence planning generating a grasp sequence based on a first type of grasp sequence planning or a second type of grasp sequence planning. The first type of grasp sequence planning may be based on the optimized cost function and minimizing added contact points and/or removed contact points, provided that they have the same cost value. The second type of grasp sequence planning may be based on a deep reinforcement learning (DRL) policy trained based on a reward function. The reward function is based on a first term indicative of the IK error, a second term indicative of the difference between the estimated required wrench and the actual wrench, and a third term indicative of the grasp efficiency. The method for object manipulation may include implementing the reference object trajectory and the grasp sequence via a robot appendage and one or more actuators.

The method for object manipulation may include receiving an initial object position, a final object position, an initial object orientation, a final object orientation, and a set of grasp candidates, calculating a planned object trajectory based on the initial object position, the final object position, the initial object orientation, the final object orientation, and the set of grasp candidates, calculating the reference object trajectory based on the planned object trajectory and the set of grasp candidates. The object path planning may be performed based on a Probabilistic Roadmap (PRM). The object trajectory optimization may be performed based on piecewise cubic B-splines.

According to one aspect, a robot for object manipulation may include a robot appendage, one or more actuators configured to drive one or more joints of the robot appendage, a planner, and a controller. The planner may perform object path planning, appendage path planning, object trajectory optimization, appendage trajectory optimization, and grasp sequence planning. Object path planning may include determining a first object pose, a second object pose, and an Nth object pose. Object trajectory optimization may include assigning a set of timestamps to the first object pose, the second object pose, and the Nth object pose, optimizing a cost function based on a first factor indicative of an inverse kinematic (IK) error, a second factor indicative of a difference between an estimated required wrench and an actual wrench, and a third factor indicative of a grasp efficiency, and generating a reference object trajectory based on the optimized cost function. Grasp sequence planning may include generating a grasp sequence by a first type of grasp sequence planning or a second type of grasp sequence planning. The first type of grasp sequence planning may be based on the optimized cost function and minimizing added contact points and/or removed contact points, provided that they have the same cost value. The second type of grasp sequence planning may be based on a deep reinforcement learning (DRL) policy trained based on a reward function. The reward function is based on a first term indicative of the IK error, a second term indicative of the difference between the estimated required wrench and the actual wrench, and a third term indicative of the grasp efficiency. The controller may implement the reference object trajectory and the grasp sequence via the robot appendage and one or more of the actuators.

The object path planning may be performed based on a Probabilistic Roadmap (PRM). The object trajectory optimization may be performed based on piecewise cubic B-splines. The second type of grasp sequence planning may not require a final grasp to generate the grasp.

DETAILED DESCRIPTION

Figure 1:
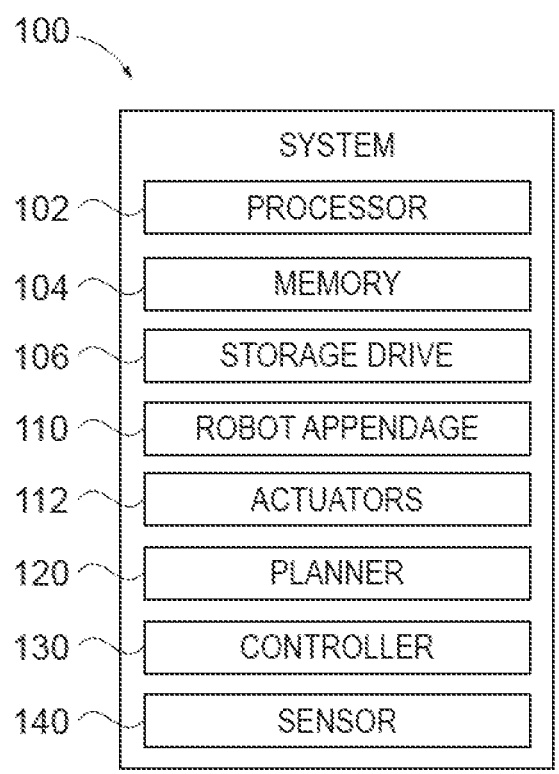
FIG. 1 is a block diagram illustrating an exemplary system for object manipulation, according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "robot system", as used herein, may be any automatic or manual systems that may be used to enhance the robot, and/or driving. Exemplary robot systems include an autonomous operation system, a stability control system, a brake system, a collision mitigation system, a navigation system, a transmission system, a steering system, one or more visual devices or sensors (e.g., camera systems, proximity sensor systems), a monitoring system, an audio system, a sensory system, a planning system, a grasping system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

A framework for planning and control of in-hand manipulation of a rigid object involving grasp changes using fully-actuated multi-fingered robotic hands is provided herein. Specifically, systems, techniques, and/or methods for in-hand manipulation tasks where the robot may reach or grasp the object as a tool are provided. While a controller including a low-level controller for object tracking and contact force control may be model-based, the grasp sequence may be planned either offline, using a model-based planner, or online, using a learning-based policy. The learning-based policy may render a hybrid approach that may be more data-efficient than other end-to-end learning approaches.

In this disclosure, a motion planning and control framework for in-hand manipulation associated with the final grasp for tool usage is discussed, provided either explicitly as a set of contact points or implicitly as the ability to apply an external wrench to the object. Given the initial and final poses of the object and the initial grasp, the framework plans the object trajectory and grasp sequence, and controls the robotic hand or appendage such that the planned object trajectory and grasp sequence are realized. One feature of the system is the model and/or learning-based approaches for grasp sequence planning.

The model-based approach may employ dynamic programming to plan the entire grasp sequence offline given the initial and final grasps. With the learning-based approach, a policy trained offline may output a sequence of contact addition and removal actions in real time based on the actual object pose. In contrast to the model-based approach, the learning-based approach does not require the final grasp to be explicitly specified but may determine the optimal grasp from the external wrench applied to the object.

FIG. 1 is a block diagram illustrating an exemplary system 100 for object manipulation, according to one aspect. The system 100 for object manipulation may include a processor 102, a memory 104, a storage drive 106, a robot appendage 110, such as a robot hand and/or robot arm, which may include one or more links and/or joints, one or more fingers, and one or more actuators 112 which may be configured to drive one or more of the joints, links, or fingers, a planner 120, a controller 130, a sensor 140 or set of sensors, and/or one or more other robot systems. The planner 120 may include an object path planner, an object trajectory optimizer, and a grasp sequence planner. In-hand manipulation may be realized in two phases, during an offline planning phase via the planner 120 and online control vis the controller 130. Respective components may be operably coupled or in computer communication with one another and may be operably coupled or in computer communication via a bus or other communication pathway. Further, one or more of the planner 120 or the controller 130 may be implemented via the processor 102, the memory 104, the storage drive 106, etc. In other words, any actions, calculations, or determinations made by the planner 120 or the controller 130 may be performed by the processor 102 and/or the memory 104.

The system 100 for object manipulation may be a robot which solves in-hand manipulation of a single rigid object using a multi-fingered robotic hand with two or more robot fingers in order to change the grasp while maintaining three-dimensional (3D) force closure. The system 100 for object manipulation may employ a model-based approach, by assuming that inertial and kinematic properties of the object and appendage, as well as the friction coefficient between the hand links and object are known. The system 100 for object manipulation may operate under the assumption that every joint is torque controlled in both directions and that each link of the robotic hand is equipped with a tactile or force-torque sensor that gives the total 3D force and center of pressure of the possibly distributed force applied to the link surface. Further, the system 100 for object manipulation may operate under the assumption that the object's pose (e.g., position and orientation) may be provided by a technique, such as vision-based object tracking.

Planner Overview

To define the planning problem, the planner 120 may define a tuple called contact information $C=\{J, c_J, c_O\}$ where J denotes the joint in contact with the object, and $c_J$ and $c_O$ may be the contact point location represented in the joint and object frames, respectively. A grasp $G=\{C_1, C_2 \ldots\}$ may be defined as a set of 0 or more contact information. If $G=\emptyset$ there is no contact, and therefore, the object is not held. To facilitate planning, a set of grasp candidates $G_{cand}$ may be provided in advance.

Given these definitions, the in-hand manipulation planning problem may be defined as follows:

Definition (in-hand manipulation planning) given
a set of grasp candidates $G_{cand}$;
initial and final grasps $G_s \in G_{cand}$ and $G_g \in G_{cand}$;
initial and final object positions $p_s$ and $p_g$; and
initial and final object orientations $R_s$ and $R_g$
find
execution time T;
object reference position $p_O(t)$ and orientation $R_O(t)$ as a function of time $t \in [0, T]$; and
sequence of grasps $G_m \in G_{cand}$=1, 2 ..., M) where M>1 is a user defined integer representing the number of uniformly distributed sampling times $$t_m = \frac{Tm}{M-1}$$

such that
the object does not collide with the stationary part of the hand (e.g., palm) or the environment;
the contact points in $G_m$ are reachable for the hand; and
the contacts in $G_m$ are able to provide the object or wrench required to generate the acceleration at $t=t_m$, along the object reference trajectory $\hat{p}_O(t)$, $\hat{R}_O(t)$.

The initial and final grasps may be found by an existing grasp planner and/or prior knowledge from human demonstrations. According to one aspect, the planner 120 may generate $G_{cand}$ by choosing 1-3 contact points for select joints, and then enumerating all combinations of contact points that do not cause collisions between the links.

The planner 120 may compute the object and/or hand path and/or trajectory planning by performing an algorithm including:

Path Planning: obtaining a collision-free path of the object such that every waypoint has at least one grasp in $G_{cand}$ in which all contact points may be reached;

Trajectory Optimization: obtaining $\hat{p}(t)$, $\hat{R}(t)$ by optimizing the timestamp of each waypoint obtained in path planning. The timestamp of the last waypoint may become the completion time T and computing $\hat{p}_{O_m}=\hat{p}_O(t_m)$ and $\hat{R}_{O_m}=\hat{R}_O(t_m)$ (m=1, 2, . . . , M); and Grasp Sequence Planning, which may be model-based or learning-based.

The model-based grasp sequence planning may utilize dynamic programming to obtain the grasp at each sampling time. The planner 120 may extract the grasp transitions by finding every sample whose grasp is different from the previous sample.

The learning-based grasp sequence planning may use deep reinforcement learning (DRL) to obtain a policy that outputs a grasp change action based on the current object pose and the external wrench to be applied to the object. Unlike the model-based grasp sequence planning where a fixed grasp sequence is used, the policy may run in real time and, therefore, may adapt to unexpected disturbances.

The learning-based grasp sequence planning may facilitate the whole framework a hybrid of model and learning-based approaches. This structure enables more data-efficient learning compared to end-to-end DRL approaches.

Thus, the planner 120 may perform object path planning, appendage path planning, object trajectory optimization, appendage trajectory optimization, and grasp sequence planning. Movement of the appendage relative to the object may or may not be independent.

Controller Overview

The controller 130 may execute the in-hand manipulation plan generated during the planning phase. The grasp sequence manager block may determine whether a grasp transition should take place based on the current object pose. When a grasp sequence precomputed by the model-based grasp sequence planning is used, a grasp transition occurs when the object pose is close to that of the sample at which the transition is expected or the time since the previous transition exceeds a given threshold (e.g., 10 seconds). With the learning-based grasp sequence planning, the DRL policy may be called with a constant time interval to determine the next grasp, which may be the same as the current grasp.

The controller 130 may include one or more low-level controllers, such as an object tracking controller, a contact force tracking controller, and a contact state tracking controller. Respective low-level controllers may be implemented together as a single controller or separately as one or more independent controllers. The object tracking controller may compute the contact forces applied to the object such that the object tracks the planned trajectory. The contact force tracking controller may compute the joint reference positions to realize the contact forces computed from the object tracking controller. The contact state tracking controller may realize the contact states dictated by the planned contact sequence via one or more of the actuators 112 and one or more joints of the robot appendage.

General Overview—Inverse Kinematics (IK)

To compute the joint positions for a given grasp with K contacts, $G=\{C_1, C_2, \ldots, C_K\}$, $C_k=\{J_k, C_{Jk}, C_{Ok}\}$ (k=1, 2, . . . , K) and object pose $p_O$, $R_O$, the system may be first compute the desired contact positions on the object represented in the global frame by:

$$p_k = p_O + R_O c_{Ok} \quad (1)$$

The system may apply an iterative algorithm that incrementally updates the joint position q by:

$$\Delta q = \arg\min Z_{IK} \quad (2)$$

$$q := q + k_{IK}\Delta q \quad (3)$$

Subject to element-wise bounds $$\frac{1}{k_{IK}}(q_{min} - q) \leq \Delta q \leq \frac{1}{k_{IK}}(q_{max} - q) \quad (4)$$

where $$Z_{IK} = \Sigma_{k=1}^{K}\|J_{Ck}\Delta q - \Delta p_k\|^2 \quad (5)$$

$$\Delta p_k = p_k - (p_{Jk}(q) + R_{Jk}(q)c_{Jk}) \quad (6)$$

$k_{IK}$ may be a positive gain, $J_{Ck}$ may be the Jacobian matrix of contact point k with respect to q, $p_{Jk}(q)$ and $R_{Jk}(q)$ denote the pose of joint $J_k$ at q and $q_{max}$ and $q_{min}$ may be the vector of maximum and minimum joint positions, respectively.

Using the total IK error defined as follows:

$$d(q, p_O, R_O, G) = \Sigma_{K=1}^{K}\|\Delta p_k\|^2 \quad (7)$$

The iteration terminates if one of the following occurs:
d(*) is below a predefined threshold;
d(*) increases from the previous iteration; or
any of the links make a contact with the environment.

If a link makes a contact with the object, project $\Delta p_k$ onto the local contact tangent so that the link slides along the surface, $$\Delta p_k := \Delta p_k - (n_k^T \Delta p_k)n_k \quad (8)$$

Where $n_k$ is the normal vector at contact k, pointing away from the object.

Let q* denote the joint positions after the iteration terminates and define the final IK error as follows:

$$d^*(p_O, R_O, G) = d(q^*p_O, R_O, G) \quad (9)$$

And the maximum squared IK error among the contact points of grasp G at object pose $\hat{p}_{O_m}$, $\hat{R}_{O_m}$, and joint position q* as:

$$\Delta p^*(m, G) = \max_{k=1,2,\ldots,K}\|\Delta p_k\|^2 \quad (10)$$

General Overview—Contact Force Optimization

Using the Newton-Euler equation of 3D rigid-body dynamics, the system may compute the total force and torque to be applied to the object moving with angular velocity $\omega_O$ to generate linear and angular accelerations $\dot{v}_O$, $\dot{\omega}_O$ by:

$$\hat{f}_{total} = M\dot{v}_O - f_E \quad (11)$$

$$\hat{\tau}_{total} = I\dot{\omega}_O + \omega_O \times I\omega_O - \tau_E \quad (12)$$

Where M and I are the mass and moments of inertia of the object and $f_E$ and $\tau_E$ are the external force and torque applied to the object by the environment or other disturbances.

Given a grasp $G=\{C_1, C_2, \ldots, C_K\}$, $C_k=\{J_k, c_{Jk}, C_{Ok}\}$ (k=1, 2, . . . , K) the system may optimize the contact forces $f_k$ by solving a quadratic program:

$$f_1^*, f_2^*, \ldots, f_K^* = \arg\min Z_f \quad (13)$$

Subject to inequality constraints $$c_{kl}^T f_k \leq 0 (k=1,2,\ldots,K; l=1,2,\ldots,L) \quad (14)$$

Where $$Z_f = \|\hat{f}_{total} - \Sigma_{k=1}^K f_k\|^2 + w_t \|\hat{\tau}_{total} - \Sigma_{k=1}^K p_{Ok} \times f_k\|^2 \quad (15)$$

$$p_{Ok} = R_{Om} c_{Ok} \quad (16)$$

L is the number of sides of the pyramid approximating the friction cone, $w_t > 0$ is a user-defined weight, and $c_{kl}$ is the normal vector of the l-th side of the pyramid at contact k which may be computed as:

$$c_{kl} = (t_{1k} t_{2k} n_k) \begin{pmatrix} \cos\theta \\ \sin\theta_l \\ -\mu \end{pmatrix} \quad (17)$$

Where $\mu$ is the friction coefficient, $t_{1k}$ is a tangent vector at contact k, $t_{2k} = t_{1k} \times n_k$ and $\theta_l = 2\pi l/L$.

The system may define the following variables related to contact forces at sample m:

$$\hat{f}_{total}(m) = \|\hat{f}_{total}\|^2 + w_t \|\hat{\tau}_{total}\|^2 \quad (18)$$

$$e^*(m,G) = \|\hat{f}_{total} - \Sigma_{k=1}^K p_{Ok} \times f_k^*\|^2 + w_t \|\tau_{total} - \Sigma_{k=1}^K p_{Ok} \times f_k^*\|^2 \quad (19)$$

$$f^*(m,G) = \Sigma_{k=1}^K \|f_k^*\|^2 \quad (20)$$

Where the argument m may indicate that the object pose, velocity, and acceleration at sample m are used. In this way, e*(m, G) may represent the residual wrench error that grasp G cannot generate.

Object Path Planner

The object path planner of the planner 120 may perform object path planning to determine a first object pose, a second object pose, an Nth object pose, etc. The first object pose may be an initial object pose associated with a current position of the object and the Nth object pose may be a final object pose or a desired position for the object for a planned object trajectory. The number of object poses (e.g., N) may not be known a priori and may be determined based on a number of valid samples a sampling-based planner may find. According to one aspect, the object path planning may be performed offline (e.g., not at runtime or ahead of real-time execution). The object path planner may generate the planned object trajectory in a manner to mitigate collisions between the robot appendage 110, features of the environment surrounding the robot, and/or the object to be grasped. As the object progresses through various stages of the planned object trajectory, the object may pass through one or more waypoints (e.g., which may be associated with one or more the first object pose, the second object pose, the Nth object pose, etc.) at one or more associated or corresponding timestamps. For example, the initial pose may be associated with a time of zero.

Among a number of available algorithms, the planner 120 may implement a sampling-based motion planning algorithm based on a Probabilistic Roadmap (PRM) called PRM*. PRM may build a roadmap of valid samples in the configuration space by random sampling. A valid path may be found by searching for a path that connects the start and goal configurations in the roadmap. PRM* may extend PRM to find an optimal path. According to one aspect, the planner 120 may use an Open Motion Planning Library (OMPL).

In the object path planning problem, the configuration space is a 6D space representing the 3D position p and orientation R of the object. A sampled configuration may be considered valid if the object pose satisfies the following two conditions:

The object does not collide with the environment (e.g., floor) or the fixed part (e.g., palm) of the robot appendage; and There exists at least one grasp G in which d*(p, R, G) is smaller than a threshold.

The planner 120 may use the path length of the planned object trajectory as the cost function to be minimized. The resulting path includes multiple waypoints in the configuration space that may be traversed from the start to goal configurations with the minimum path length among the ones available with the roadmap.

Object Trajectory Optimizer

The object trajectory optimizer of the planner 120 may perform object trajectory optimization based on the planned object trajectory to generate the reference object trajectory. Object trajectory optimization may include assigning a set of timestamps to the first object pose, the second object pose, the Nth object pose, etc. In this way, the object trajectory optimizer of the planner 120 may determine one or more timings at which the object reaches one or more of the waypoints associated with the planned object trajectory from the object path planner, and thus, generate a trajectory of the object as a function of time. Stated yet another way, the object trajectory optimizer of the planner 120 may be utilized to determine the pose and/or position of the object at any given time.

Object trajectory optimization may include optimizing a cost function based on a first factor indicative of an inverse kinematic error, a second factor indicative of a difference between an estimated required wrench and an actual wrench, and a third factor indicative of a grasp efficiency. Object trajectory optimization may include generating a reference object trajectory based on the optimized cost function.

The first factor (d*) may be indicative of measurements of contact points reachable for the robot fingers, thereby eliminating grasps where contact points are unreachable.

The second factor (e*) may represent a difference between an estimated contact force required to move an object along the planned object trajectory or the reference object trajectory and contact forces which may be actually provided in reality. For example, because a single contact point cannot possibly be utilized to grasp an object (e.g., without implementing magnetism, etc.), e* associated with the mere use of the single contact point may be a large value.

The third factor (f*) may be a squared sum of all of the contact forces, which may be implemented to minimize contact force utilized to perform a grasp. In other words, from the point of view of energy expenditure, it may be desirable to minimize the amount of force applied to the object, and thus minimizing this last (f*) term may facilitate efficient energy usage.

Object trajectory optimization may include generating a reference object trajectory based on the optimized cost function.

The planner 120 may convert the planned path to a trajectory and compute the objects reference pose, velocity and acceleration at any given time $t \in [0,T]$.

Let N denote the number of waypoints of the path obtained by path planning. The planner 120 may set a goal to determine the timestamp t of waypoint i (i=1, 2, ..., N), with constraints $t_1=0$, $t_{i-1} + \Delta t_{min} \leq t_i (2 \leq i \leq N)$ and $t_N \leq T_{max}$ where $\Delta t_{min} > 0$ is the minimum interval between waypoints and $T_{max}$ is the maximum duration.

Given a set of timestamps, the planner 120 may interpolate the waypoints with piecewise cubic B-splines such that the trajectory passes the initial and final poses with zero velocity. As a result, the planner 120 may obtain seven sets of cubic B-splines for the three position components and four quaternion components. The planner 120 may use these B-splines to sample the whole trajectory at M sample points with a uniform time interval $t_N/(M-1)$.

The planner 120 may formulate the problem of determining the timestamps as a numerical optimization problem with a cost function:

$$Z_1 = \Sigma_{m=1}^{M} c^*(m) \tag{21}$$

Where $c^*(m)$ is the cost at sample m ($1 \leq m \leq M$) which may be obtained as $c^*(m) = \min\_(G \in (G_{cand}) c(m, G)$ where $c(m, G)$ is the cost for using grasp G at sample m defined as follows. The interpolated trajectory may give the position $p_{O_m} = p_O(t_m)$ orientation $R_{O_m} = R_O(t_m)$ linear and angular velocities $v_{O_m}$ and $\omega_{O_m}$ and linear and angular accelerations $\dot{v}_{O_m}$ and $\dot{\omega}_{O_m}$ at sample m. Using these quantities, $c(m, G)$ may be computed by:

$$c(m,G) = d^*(p_{O_m}, R_{O_m}, G) + w_e e^*(m,G) + w_f f^*(m,G) \tag{22}$$

Where $w_e$ and $w_f$ may be user-defined weights. The three terms $d^*(*)$, $c^*(*)$ and $f^*(*)$ are defined herein.

According to one aspect, the planner 120 may use the Constrained Optimization by Linear Approximations (COBYLA) algorithm implemented in the NLopt library.

Grasp Sequence Planner

The grasp sequence planner of the planner 120 may include generating a grasp sequence or perform grasp sequence planning based on a first type of grasp sequence planning or a second type of grasp sequence planning. A grasp may include one or more desired contact points for the object and which links or joints of the robot appendage associated with that contact. For example, the robot fingertip of the thumb, the robot fingertip of the index finger, and the robot fingertip of the little finger may be scheduled for contact with the object at three different contact points.

The grasp sequence may be indicative of the kinds of types of grasp the robot appendage 110 or robot appendage may transition through during any in-hand manipulation tasks or phases. Generally, grasps may be very different, and thus, the robot appendage may transition through one or more intermediate grasps between the initial grasp and the final grasp. In this way, grasp sequence planning may be implemented to determine the sequence of grasps to connect the initial grasp and the final grasp via one or more intermediary grasps (e.g., a second grasp, a third grasp, etc.).

Model-Based Grasp Sequence Planner

The first type of grasp sequence planning may be a model-based type of grasp sequence planning and be based on the optimized cost function and minimizing added contact points and/or removed contact points, provided that they have the same cost value. The first, model-based type of grasp sequence planning may be performed offline.

The grasp sequence planner of the planner 120 may plan the grasp sequence or performing grasp sequence planning based on or given the trajectory of the object as the function of time and given the initial grasp and the final grasp.

According to one aspect, the grasp sequence planner may implement one or more grasp constraints. For example, if there is a grasp constraint regarding which grasps may be directly transitioned therebetween, the grasp sequence planner may implement such grasp constraints. One example of a grasp constraint may be to merely add or remove a single contact from one finger at a time. In other words, according to one aspect, it may be impermissible to add a contact point and remove a contact point simultaneously or concurrently. Additionally, the grasp sequence planner may perform a reality check in terms of whether a desired contact force may be produced to support the object and move the object along the desired object trajectory. In this way, the grasp sequence planner may consider or implement one or more of the grasp constraints.

Further, the grasp sequence planner of the planner 120 may implement a penalty for a high number of changes of contact points. For example, a penalty may be implemented for adding a contact point and a penalty may be implemented for removing a contact point. In this way, the penalty implemented by the grasp sequence planner of the planner 120 may mitigate switching back and forth between similar grasps, thereby reducing flip-flopping between contact points and/or grasps and a number of rearrangements or transitions the robot appendage may execute to perform the task or grasp.

The model-based grasp sequence planning for determining the grasp used at each sample on the trajectory may be implemented by setting a goal to find a sequence of grasps that is feasible in terms of contact points and object trajectory tracking. The grasp sequence planner may set $f_E = 0$ and $\tau_E = 0$ e.g., no external wrench is applied to the object.

Since the grasp sequence planner may be implemented as a discrete planning problem, dynamic programming (DP) may fit well. DP may be implemented to determine the sequence of grasps $G_1, G_2, \ldots, G_M$ that minimizes the cost function:

$$Z_2 G_1, G_2, \ldots, G_M = \Sigma_{m=1}^{M} c^*(m, G_m) + \Sigma_{m=2}^{M} r(G_{m-1}, G_m) \tag{23}$$

Where $c^*(m, G_m)$ has been defined in (22) and $r(G_i, G_j)$ is the cost to transition from grasp $G_i$ to $G_j$:

$$r(G_i, G_j) = \begin{cases} r+ & \text{for each contact added at } G_j \\ r- & \text{for each contact removed at } G_j \end{cases} \tag{24}$$

This cost or penalty may be introduced to prevent or mitigate flipping between grasps with similar costs.

To reduce the computational load for DP, omit grasp G for sample m if either $d^*(p_{O_m}, R_{O_m}, G)$ or $e^*(m, G)$ exceeds respective user-defined thresholds (e.g., $10^{-8}$ or $10^{-4}$). Furthermore, transition from $G_i$ to $G_j$ may be prohibited if:

The transition requires both addition and removal of contacts in a simultaneous fashion; or The same finger is in contact at different locations on the object.

In this way, reality checks may be provided by the grasp sequence planner to implement one or more of the grasp constraints, such as constraints of the low-level controllers.

Deep Reinforcement Learning-Based Grasp Sequence Planner

The second type of grasp sequence planning may be based on a deep reinforcement learning (DRL) policy trained utilizing a reward function. The reward function is based on a first term indicative of the IK error, a second term indicative of the difference between the estimated required wrench and the actual wrench, and a third term indicative of the grasp efficiency. The second, DRL-based type of grasp sequence planning may be trained offline, but executed online, in real-time.

During the training phase, domain randomization may be implemented. In other words, variations may be added during the training phase, thereby improving the generated policy to be robust against variations, meaning the domain randomized training may be more successful in realizing the motion compared to other offline plan sequences, which cannot adapt to the variations.

Examples of inputs to the DRL network may include the object pose, a current grasp, and an external force/torque applied to the object.

During sequence generation, the grasp sequence planner may utilize the deep neural network to train a policy that may generate an action indicative of what a desired grasp may be at each time frame.

By examining the object's trajectory at each time stamp and by analyzing a current grasp, the grasp sequence planner may determine which actions may be taken subsequently. If there is any change or variation in the object's pre-defined trajectory, the actions may be modified, or the grasp may be modified based on the actual object's trajectory, according to the policy. Further, the policy may enable a change to the final grasp on the fly or during execution, for example. This may be possible because the policy does not require a final grasp as an input and also because the policy may use external force and torque applied to the object to determine the final grasp associated with tool use.

In this regard, another advantage of the DRL policy is that merely partial information regarding the contact may be provided for execution. According to one aspect utilizing the offline DRL policy, a set of grasps may be determined ahead of time, and the planner 120 may determine which set of grasps to transition through. However, with the machine learning-based grasp sequence planning, the predefined grasp set (e.g., grasp, final grasp, goal grasp, etc.) is not required. The system may merely provide the contact information, meaning where the contact point on the robot finger and object should be to determine what actions should be taken and generate the grasp based on the actions to be taken.

According to one aspect, the grasp sequence planner may define reward functions to be maximized. The reward function may consider whether the object is reachable to fingers, whether forces may be realized, and efficiency of forces or grasp efficiency. However, the reward function may be implemented with weights for one or more of these terms.

According to one aspect, a RL-based contact sequence planner may be used in place of the Dynamic Programming (DP)-based planner. Advantages of the RL-based planner may include 1) the contact sequence is generated in real-time and therefore may be adapted to unexpected deviation of the object pose, 2) the final grasp $G_g$ is automatically determined by the policy, and 3) only a set of contact information C may be defined whereas the DP-based planner requires a set of grasp candidates $G_{cand}$. Use DRL to find a policy that determines the sequence of grasps starting from the known initial grasp $G_s$ to move the object along the reference trajectory $(\hat{p}_O(t), \hat{R}_O(t))$.

One goal of DRL may be to find the parameters $\theta$ of a deep neural network policy $\alpha = \pi_\theta(s)$ such that the discounted reward $R = \Sigma_m \gamma^{M-m} R(s_m, \alpha_m)$ is maximized under the system dynamics $s_{m+1} = h(s_m, \alpha_m)$ where $\gamma \in [0,1]$ is the discount factor. The state $s_m$ may include the grasp $G_m$, object pose $(p_{O_m}, R_{O_m})$ and external force $f_{E_m}$ and torque $\tau_{E_m}$. Example usage of $f_{E_m}$ and $\tau_{E_m}$ include the torque to loosen or tighten a bolt using a wrench, and they may be added at the last few samples of a trajectory. The action set includes $I = N_C + N_J + 1$ actions where $N_C = \Sigma_{k=1}^{N_J} n_{C(k)}$, $n_{C(k)}$ is the number of contact candidates available for joint k, and $N_j$ is the number of joints in the appendage. The actions include adding one of the contact candidates (add(C)), removing a contact (remove (C)) and keeping the current grasp. Some of the actions may be invalid at particular states. For example, it is impossible to remove a non-existent contact, or add a contact that already exists. The system may not allow a joint to change the contact point without first removing the contact. Finally, the system dynamics h $(S_m, \alpha_m)$ may proceed to the next sample m+1 and update the grasp according to the action $\alpha_m$.

The reward function at sample m may be defined as follows:

$$R(s_m, a_m) = \\ -1 w_1 \Delta p^*(m, G_m) - w_2 c^*(m, G_m) + \frac{w_3 \hat{f}_{total}(m)}{f^*(m, G_m)} - t(m, G_{(m-1)}) \quad (25)$$

Where $w_i > 0$ (i=1,2,3) may be user-defined weights. The first two terms of equation (25) encourage the agent to avoid actions that result in large IK error or wrench error. The third term rewards grasps that require smaller contact forces, and $t(m, G_m)$ may be a penalty to discourage invalid actions such as adding a new contact to a joint already in contact and may be defined as follows:

$$t(m, G_{m-1}) = \begin{cases} 2 & \text{if } a_m = \text{add } (C) \wedge C \in G_{m-1} \\ 2 & \text{if } a_m = \text{remove } (C) \wedge C \notin G_{m-1} \\ 10 & \text{if } a_m = \text{add } (C_i) \wedge \exists j \neq i \ni J_i = J_j \\ 0 & \text{otherwise} \end{cases} \quad (26)$$

Using $e^*(m, G_m)$ in the reward function along with external wrench $f_{E_m}$, $\tau_{E_m}$ in the state implicitly guides the DRL toward a grasp suitable for applying the required wrench to the object. This may be in contrast to the model-based grasp sequence planning where the final grasp has to explicitly given due to the use of DP.

To improve robustness, the system may adopt domain randomization. Specifically, during training, the system may add random variations in the range of [−0.01, 0.01] (m) for position and [−0.1,0.1] (rad) for orientation to the given initial $(p_s, R_s)$ and final $(p_g, R_g)$ object poses. This may improve the robustness against uncertainties and disturbances by adding noise to the external force $f_{E_m}$ and $\tau_{E_m}$.

Manipulation Controller

The controller 130 may implement the reference object trajectory and the grasp sequence via the robot appendage 110 and one or more of the robot joints and/or actuators 112 in an online or real-time fashion.

The controller 130 may receive the grasp sequence and the planned object trajectory or the reference object trajectory. The controller 130 may realize and/or execute the object trajectory and grasp sequence by moving the object along the planned object trajectory or the reference object trajectory and executing the grasp sequence generated during the grasp sequence planning by performing object pose tracking, contact force tracking, and managing the grasp sequence.

Object Pose Tracking

Object pose tracking may include computing, by the controller 130, an observation that the object should move in order to track the planned trajectory. Given the observation, the controller 130 may compute contact poses desired to be exerted at each contact point of the grasp.

Let $p_O$ and $R_O$ denote the current object position and orientation, respectively. Given the current reference object position $\hat{p}_O(t)$ and orientation $\hat{R}_O(t)$, the controller 130 may compute the desired object acceleration by the following:

$$\dot{\hat{v}}_O = k_{P1}(\hat{p}_O(t) - p_O) - k_{D1}\hat{v}_O \qquad (27)$$

$$\dot{\hat{\omega}}_O = k_{P2}\Delta r_O - k_{D2}\hat{\omega}_O \qquad (28)$$

Where $k_{P1}$, $k_{D1}$, $k_{P2}$, $k_{D2} > 0$ may be feedback gains, $\Delta r_O$ may be a vector given by $a \sin\theta$ where $a$ and $\theta$ are the rotation axis and angle to transform $R_O$ to $R_O(t)$ and $\hat{v}_O$ and $\hat{\omega}_O$ are obtained by integrating $\dot{\hat{v}}_O$, $\hat{\omega}$ and $\omega_O$, respectively. According to one aspect, the controller 130 may not consider measured object velocity due to noise. Instead, the controller 130 may use the integration of desired object acceleration for the damping term. The controller 130 may use $\hat{v}_O$, $\hat{\omega}_O$, and $\dot{\hat{\omega}}_O$ to optimize the contact forces for the given grasp.

Contact Force Tracking

Given poses that each contact point of grasp should produce, the controller 130 may control hand joints to produce desired contact forces. The controller 130 may convert the contact pose error to a position error of the contact point and/or consider the feedback gains at each joint in order to convert the pose error into position error. The controller 130 may determine a force the robot finger may produce at a corresponding contact point and convert the force error into a position error. In this way, feedback gains may be considered during contact force control or contact force tracking.

The optimized contact forces $f_k^*$ may be tracked by the controller 130 similar to admittance control as follows. The system 100 for object manipulation may operate under the assumption that contact point k is on the j-th finger and there is no other contact point on the robot finger. Let $J_{Ckj}$ denote the Jacobian matrix of the position of contact point k with respect to the joint positions of finger j. The contact force error at a contact point k, $\Delta f_k = f_k^* - f_k$ may be compensated by applying a joint torque offset $\Delta \tau_j = J_{Ckj}^T \Delta f_k$. Let $K_{Pj}$ denote a diagonal matrix whose elements are the proportioned gains of the joints of finger j. Then $\Delta \tau_j$ may be produced by changing the reference joint positions of finger j by:

$$\Delta q_j = K_{Pj}^{-1}\Delta\tau_j \qquad (29)$$

Directly adding $\Delta q_j$ to the current joint reference positions may cause an issue if the object is to track a given trajectory because the robot finger also has to follow the object motion. To solve this, the controller 130 may compute the contact point displacement due to object motion by:

$$\Delta p_{Ok} = \Delta t(\hat{v}_O + \hat{\omega}_O \times p_{Ok}) \qquad (30)$$

This may be then added to the contact point displacement required to generate the desired contact force computed by equation (29).

$$\Delta p_k = J_{Ckj}\Delta q_j + p_{Ok} \qquad (31)$$

Equation (31) may be used in place of equation (6) by a single iteration of the IK algorithm to obtain the new joint reference position, which may be tracked by a proportional-derivative controller with gravity compensation.

Managing Grasp Sequence/Contact State Change

The controller 130 may perform grasp sequence management by computing where points on the robot finger should be and computing inverse kinematics (IK) to determine joint angles and moving the robot finger accordingly to the desired contact point. The controller 130 may change the grasp by adding an additional contact point or removing an existing contact point based on the IK. To add a contact, the controller 130 may compute where new or additional contact points are and instruct the actuator 112 to drive a corresponding robot finger to be in contact toward desired contact point using the IK. To remove a contact, the controller 130 may instruct the actuator 112 to move the robot finger away from the object.

Joint condition references may be tracked using the controller 130 that computes the joint torques to drive the robot and the robot may adjust commands and torques for the actuator 112 to move the joints. Because the controller 130 is executed using online control, the loop may run continuously as well as during motion, thereby providing real-time feedback control for the object grasping.

In this way, during a grasp change, the controller 130 may either add a new contact or remove an existing contact. To add a new contact, the controller 130 may use the IK algorithm to move the desired contact point on the robot finger toward the contact point on the object. Once a contact force is detected, the robot finger may be controlled to maintain a small constant contact force (e.g., 0.1 N) using the force tracking controller until the contact force is maintained above a threshold (e.g., 0.05 N) for a given duration (e.g., 0.1 s). The reference object pose may be fixed until the new contact is established.

When an existing contact is to be removed, the robot finger may be controlled by the IK algorithm such that the contact point moves away from the object in the direction of the normal vector. The new grasp may be considered to be established when no force at the contact to be removed is detected for a given duration (e.g., 1.0 s).

Figure 2:
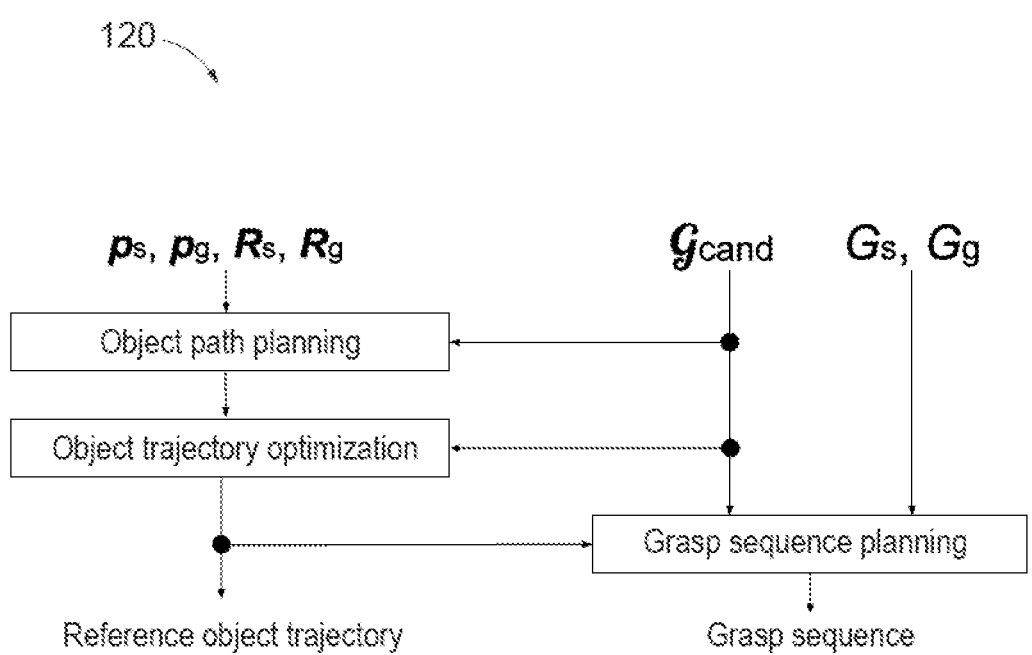
FIG. 2 is a block diagram illustrating an exemplary planner of the system for object manipulation of FIG. 1, according to one aspect.

FIG. 2 is a block diagram illustrating an exemplary planner 120 of the system 100 for object manipulation of FIG. 1, according to one aspect. As seen in FIG. 2, the object path planner may receive one or more inputs of initial object position and final object position $p_s$ and $p_g$, initial object orientation and final object orientation $R_s$ and $R_g$, and the set of grasp candidates $G_{cand}$ and generate the planned object trajectory based thereon. Thus, the object path planner may calculate the planned object trajectory based on the initial object position, the final object position, the initial object orientation, the final object orientation, and the set of grasp candidates.

The planned object trajectory and the set of grasp candidates $G_{cand}$ may be provided to the object trajectory optimizer. The object trajectory optimizer may generate the reference object trajectory based thereon. In other words, the object trajectory optimizer may receive the planned object trajectory and the set of grasp candidates and the object trajectory optimizer may calculate the reference object trajectory based on the planned object trajectory and the set of grasp candidates.

The grasp sequence planner may receive the set of grasp candidates $G_{cand}$ and the initial and final grasps $G_s \in G_{cand}$ and $G_g \in G_{cand}$, and perform the grasp sequence planning accordingly to generate the grasp sequence.

Figure 3:
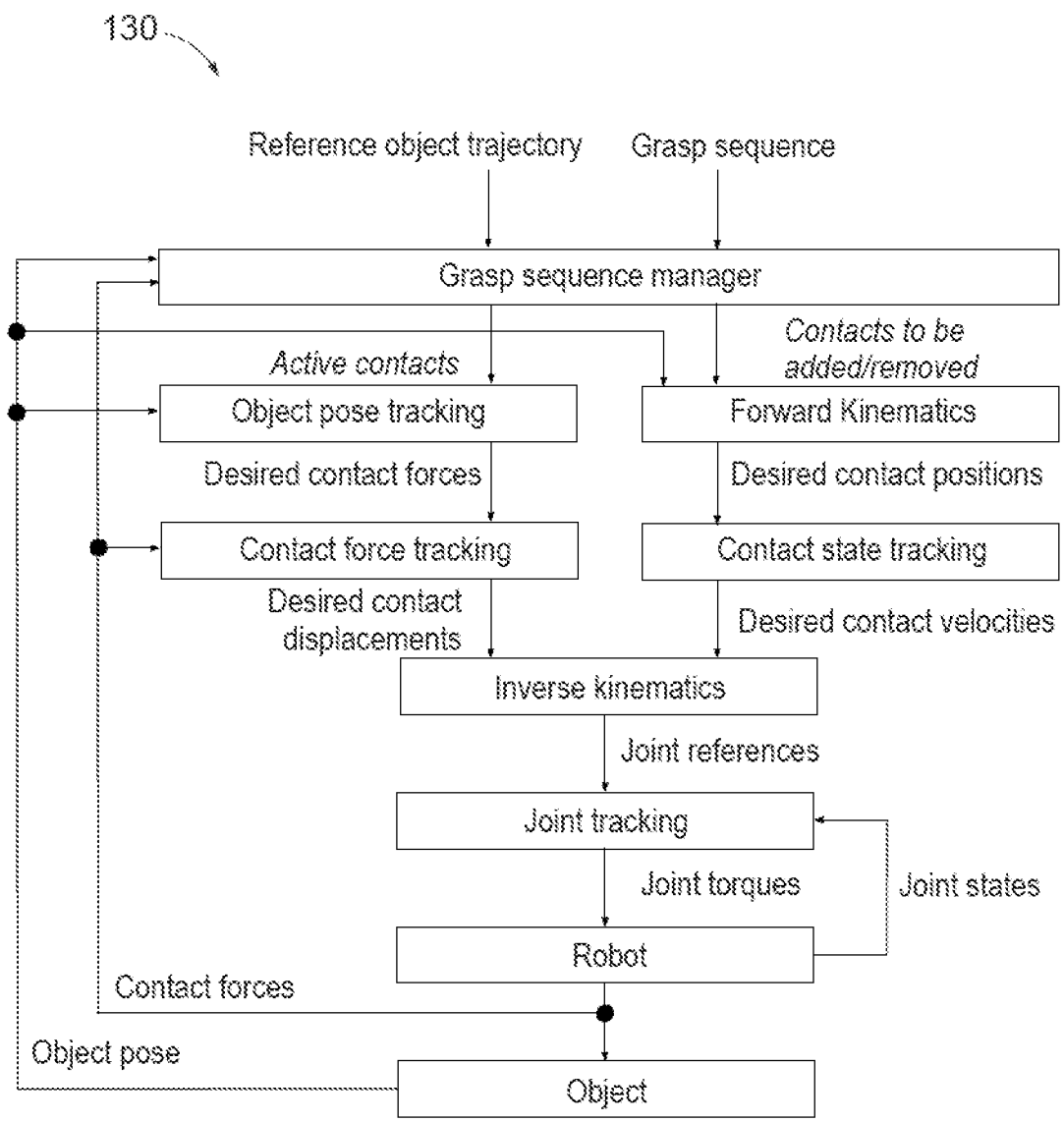
FIG. 3 is a block diagram illustrating an exemplary controller of the system for object manipulation of FIG. 1, according to one aspect.

FIG. 3 is a block diagram illustrating an exemplary controller 130 of the system 100 for object manipulation of FIG. 1, according to one aspect. The grasp sequence manager may receive the reference object trajectory and the grasp sequence from the planner 120. The robot sensors may provide contact forces and the object pose to the grasp sequence manager. Based on the reference object trajectory, the grasp sequence, the contact forces, and the object pose, the grasp sequence manager may perform object pose tracking, and contact force tracking. Further, the grasp sequence manager may manage active contact points, desired contact forces, desired contact displacements, contacts to be added via forward kinematics, contacts to be removed via forward kinematics, desired contact positions via contact state tracking, desired contact velocities via contact state tracking, etc.

The controller 130 may implement inverse kinematics (IK) to provide joint references and joint tracking of joint torques and joint states to control the appendage 110 of the robot, thereby enabling the robot to manipulate the object. The controller 130 may implement the reference object trajectory and the grasp sequence via the robot appendage 110 and one or more actuators 112.

Figure 4:
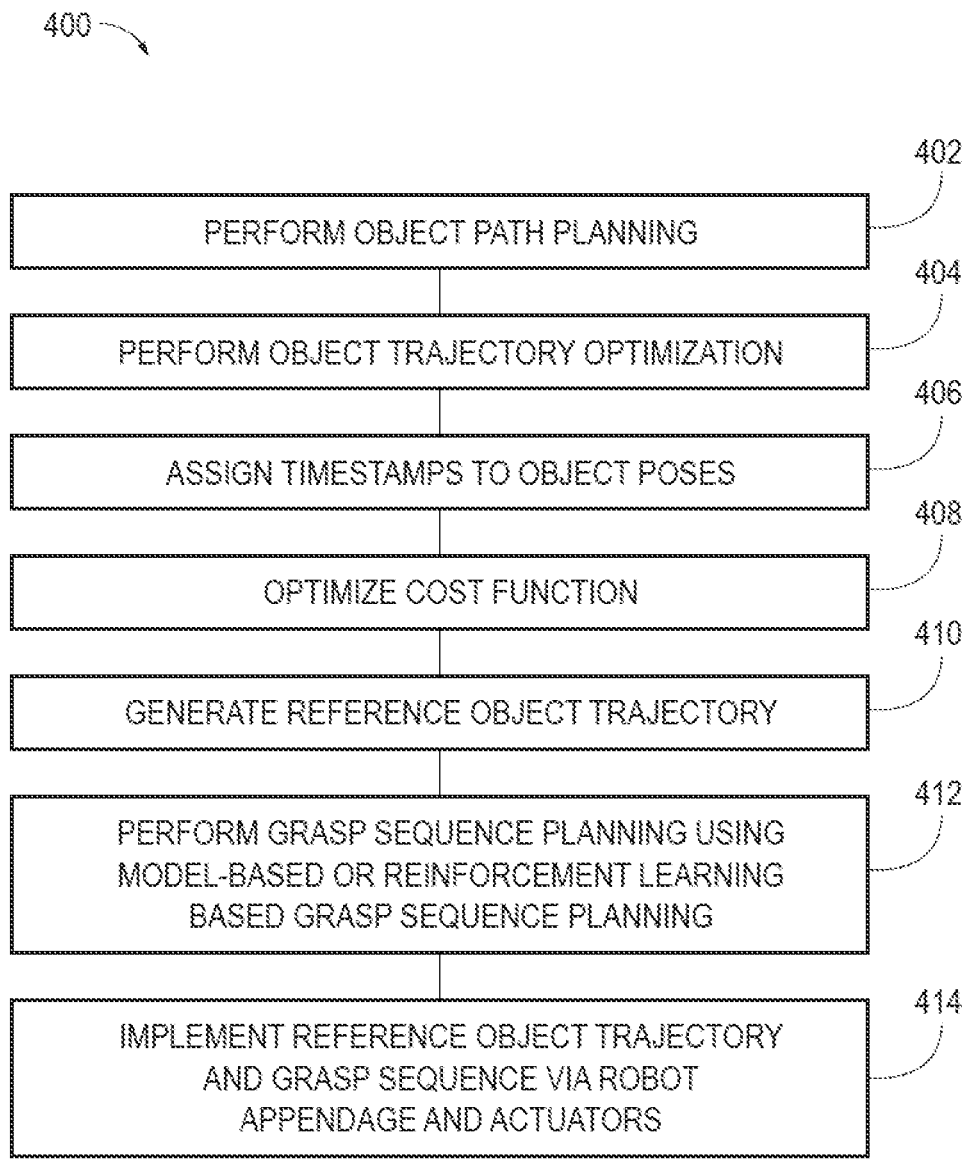
FIG. 4 is a flow diagram illustrating a method for object manipulation, according to one aspect.
Figure 5:
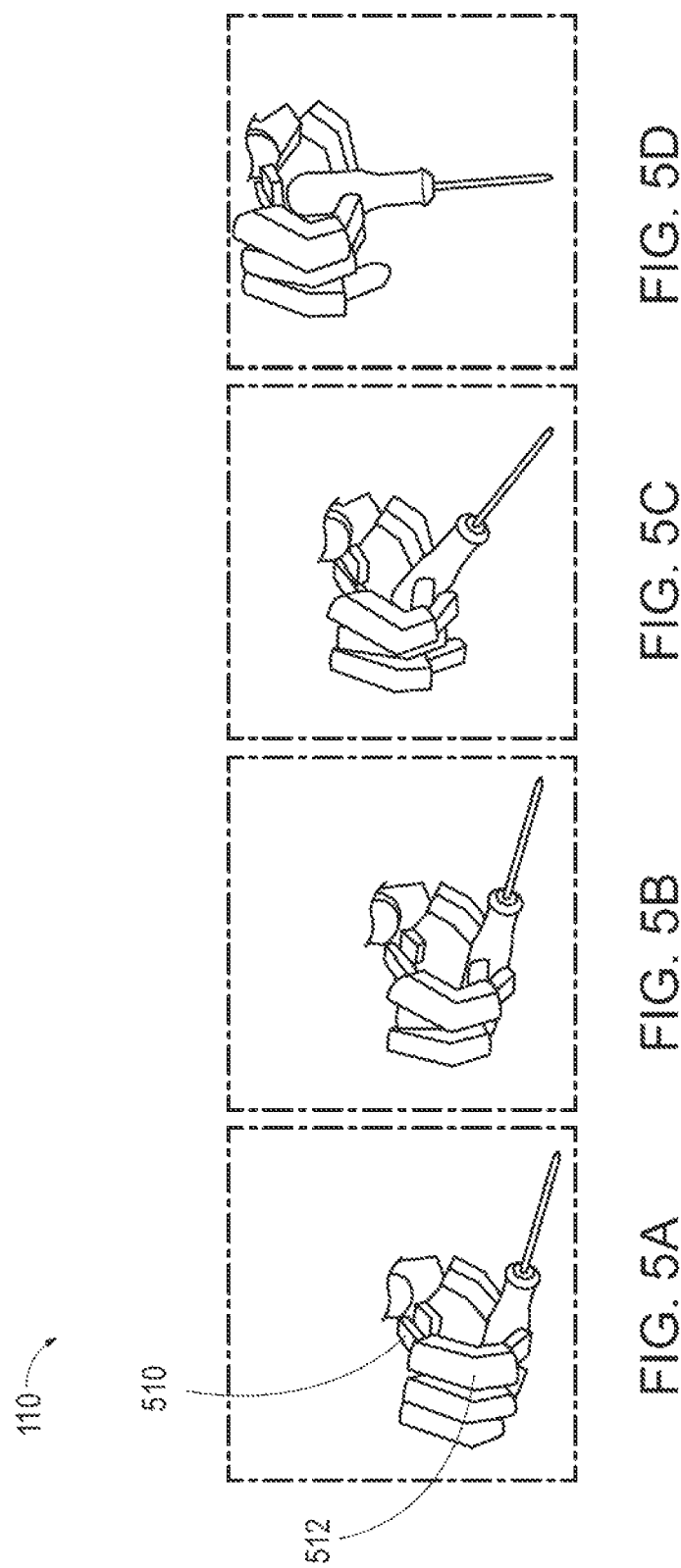
FIG. 5A-5D are illustrations of an exemplary implementation of a system for object manipulation, according to one aspect.

FIG. 4 is a flow diagram illustrating a method 400 for object manipulation, according to one aspect. According to one aspect, the method 400 for object manipulation may include performing object path planning 402 to determine a first object pose, a second object pose, and an Nth object pose, performing object trajectory optimization 404 by assigning a set of timestamps 406 to the first object pose, the second object pose, and the Nth object pose, optimizing a cost function 408 based on a first factor indicative of an inverse kinematic (IK) error, a second factor indicative of a difference between an estimated required wrench and an actual wrench, and a third factor indicative of a grasp efficiency, and generating a reference object trajectory 410 based on the optimized cost function. The method 400 for object manipulation may include performing grasp sequence planning 412 generating a grasp sequence based on a first type of grasp sequence planning or a second type of grasp sequence planning. The first type of grasp sequence planning may be based on the optimized cost function and minimizing added contact points and/or removed contact points, provided that they have the same cost value. The second type of grasp sequence planning may be based on a deep reinforcement learning (DRL) policy trained based on a reward function. The reward function is based on a first term indicative of the IK error, a second term indicative of the difference between the estimated required wrench and the actual wrench, and a third term indicative of the grasp efficiency. The method 400 for object manipulation may include implementing 414 the reference object trajectory and the grasp sequence via a robot appendage 110 and one or more actuators 112.

The method for object manipulation may include receiving an initial object position, a final object position, an initial object orientation, a final object orientation, and a set of grasp candidates, calculating a planned object trajectory based on the initial object position, the final object position, the initial object orientation, the final object orientation, and the set of grasp candidates, calculating the reference object trajectory based on the planned object trajectory and the set of grasp candidates. The object path planning may be performed based on a Probabilistic Roadmap (PRM). The object trajectory optimization may be performed based on piecewise cubic B-splines.

FIG. 5A-5D are illustrations of an exemplary implementation of a system 100 for object manipulation, according to one aspect. As seen in FIGS. 5A-5D, the robot appendage 110 may be a robot appendage which may include one or more links 510, one or more joints 512, one or more actuators 112, etc. and be driven by the controller 130 to manipulate objects, such as tools.

Figure 6:
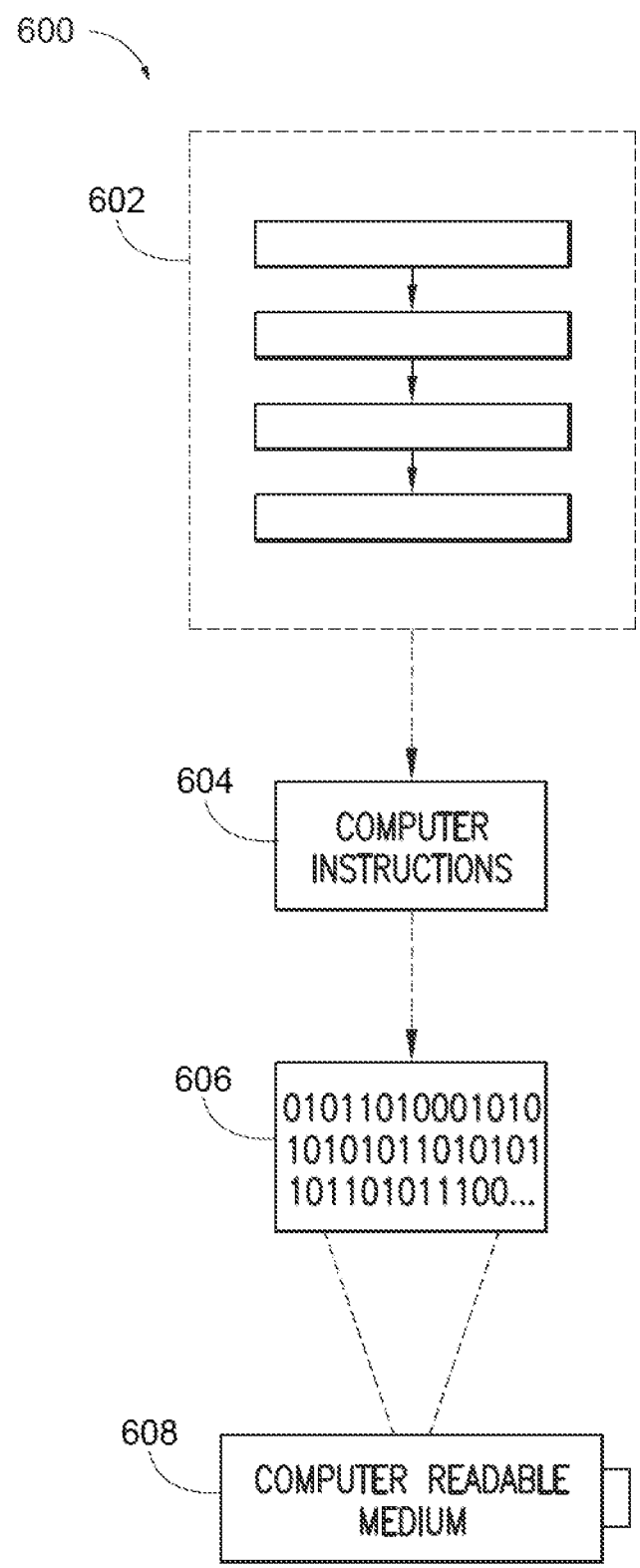
FIG. 6 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein. In this implementation 600, the processor-executable computer instructions 604 may be configured to perform a method 602, such as the method 400 of FIG. 4. In another aspect, the processor-executable computer instructions 604 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
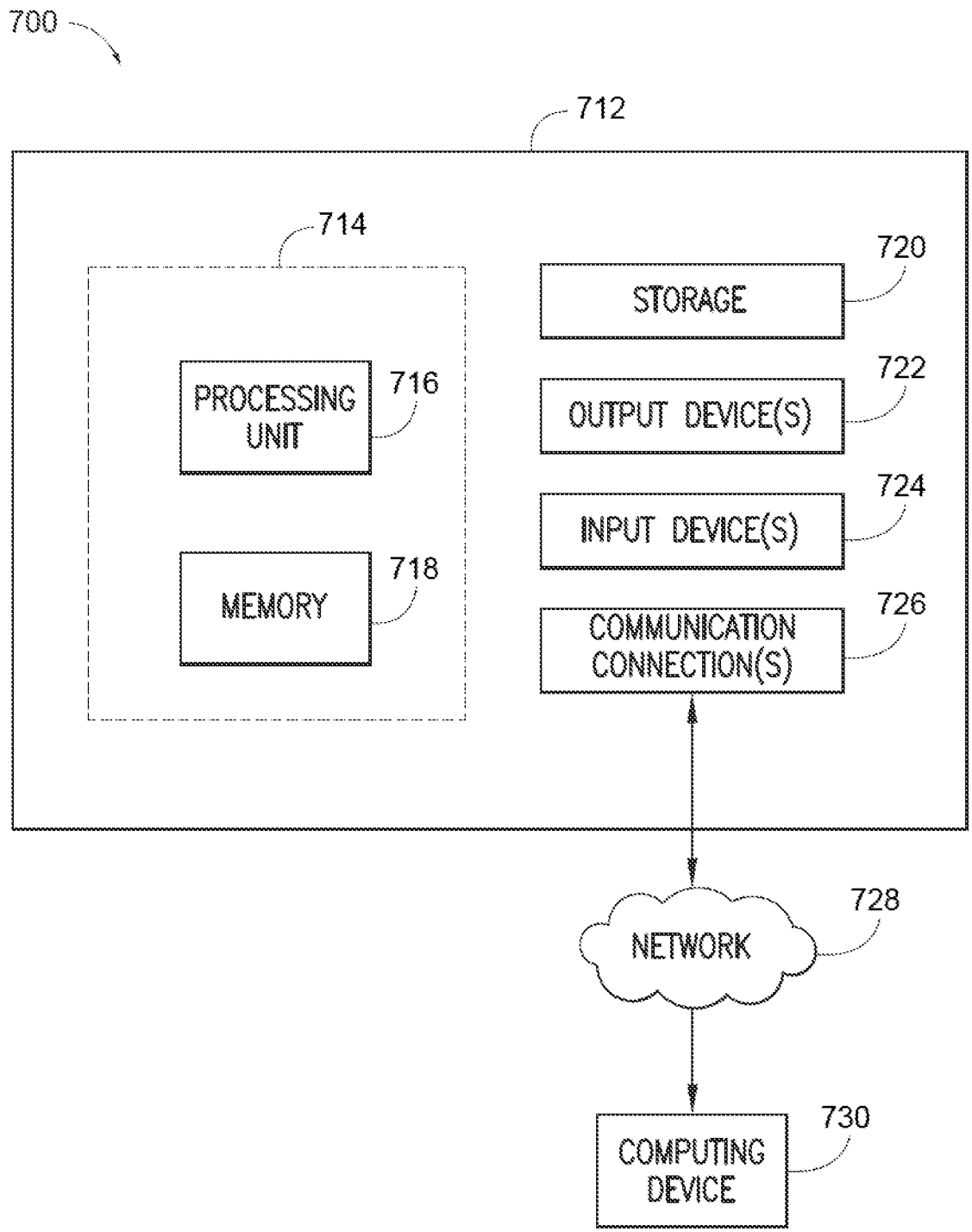
FIG. 7 is an illustration of an example computing environment where one or more of the provisions set forth herein are implemented, according to one aspect.

FIG. 7 and the following discussion provide a description of a suitable computing environment to implement aspects of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including a computing device 712 configured to implement one aspect provided herein. In one configuration, the computing device 712 includes at least one processing unit 716 and memory 718.

Depending on the exact configuration and type of computing device, memory 718 may be volatile, such as RAM, non-volatile, such as ROM, flash memory, etc., or a combination of the two. This configuration is illustrated in FIG. 7 by dashed line 714.

In other aspects, the computing device 712 includes additional features or functionality. For example, the computing device 712 may include additional storage such as removable storage or non-removable storage, including, but not limited to, magnetic storage, optical storage, etc. Such additional storage is illustrated in FIG. 7 by storage 720. In one aspect, computer readable instructions to implement one aspect provided herein are in storage 720. Storage 720 may store other computer readable instructions to implement an operating system, an application program, etc. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 712. Any such computer storage media is part of the computing device 712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 712 includes input device(s) 724 such as keyboard, mouse, pen, voice input device, touch input device, infrared cameras, video input devices, or any other input device. Output device(s) 722 such as one or more displays, speakers, printers, or any other output device may be included with the computing device 712. Input device(s) 724 and output device(s) 722 may be connected to the computing device 712 via a wired connection, wireless connection, or any combination thereof. In one aspect, an input device or an output device from another computing device may be used as input device(s) 724 or output device(s) 722 for the computing device 712. The computing device 712 may include communication connection(s) 726 to facilitate communications with one or more other devices 730, such as through network 728, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A system for object manipulation, comprising:
    a planner performing:
        object path planning to determine a first object pose, a second object pose, and an Nth object pose;
        object trajectory optimization by:
            assigning a set of timestamps to the first object pose, the second object pose, and the Nth object pose;
            optimizing a cost function based on a first factor indicative of an inverse kinematic (IK) error, a second factor indicative of a difference between an estimated required wrench and an actual wrench, and a third factor indicative of a grasp efficiency; and
            generating a reference object trajectory based on the optimized cost function, wherein
            the planner uses a path length of a path of a planned object trajectory as the cost function to be minimized and the reference object trajectory is based on the planned object trajectory, and
            the path of the planned object trajectory includes a plurality of waypoints representing the first object pose, the second object pose, and the Nth object pose at the assigned corresponding timestamps such that the plurality of waypoints is traversed from a start configuration to a goal configuration with a minimum path length of the path; and
        grasp sequence planning generating a grasp sequence by a first type of grasp sequence planning or a second type of grasp sequence planning,
            wherein the first type of grasp sequence planning is based on the optimized cost function and minimizing added contact points and/or removed contact points, wherein the second type of grasp sequence planning is based on a deep reinforcement learning (DRL) policy trained based on a reward function, wherein the reward function is based on a first term indicative of the IK error, a second term indicative of the difference between the estimated required wrench and the actual wrench, and a third term indicative of the grasp efficiency; and a controller, implementing the reference object trajectory and the grasp sequence via a robot appendage and one or more actuators.

2. The system for object manipulation of claim 1, wherein the planner includes an object path planner, an object trajectory optimizer, and a grasp sequence planner.

3. The system for object manipulation of claim 2, wherein the object path planner performs the object path planning, wherein the object trajectory optimizer performs the object trajectory optimization, and wherein the grasp sequence planner performs the grasp sequence planning.

4. The system for object manipulation of claim 2, wherein the object path planner receives an initial object position, a final object position, an initial object orientation, a final object orientation, and a set of grasp candidates.

5. The system for object manipulation of claim 4, wherein the object path planner calculates a planned object trajectory based on the initial object position, the final object position, the initial object orientation, the final object orientation, and the set of grasp candidates.

6. The system for object manipulation of claim 5, wherein the object trajectory optimizer receives the planned object trajectory and a set of grasp candidates.

7. The system for object manipulation of claim 6, wherein the object trajectory optimizer calculates the reference object trajectory based on the planned object trajectory and the set of grasp candidates.

8. The system for object manipulation of claim 1, wherein the object path planning is performed based on a Probabilistic Roadmap (PRM).

9. The system for object manipulation of claim 1, wherein the object trajectory optimization is performed based on piecewise cubic B-splines.

10. The system for object manipulation of claim 1, wherein the second type of grasp sequence planning does not require a final grasp to generate the grasp sequence.

11. A method for object manipulation, comprising:
performing object path planning to determine a first object pose, a second object pose, and an Nth object pose;
performing object trajectory optimization by:
assigning a set of timestamps to the first object pose, the second object pose, and the Nth object pose;
optimizing a cost function based on a first factor indicative of an inverse kinematic (IK) error, a second factor indicative of a difference between an estimated required wrench and an actual wrench, and a third factor indicative of a grasp efficiency; and
generating a reference object trajectory based on the optimized cost function, wherein
a path length of a path of a planned object trajectory is the cost function to be minimized and the reference object trajectory is based on the planned object trajectory, and
the path of the planned object trajectory includes a plurality of waypoints representing the first object pose, the second object pose, and the Nth object pose at the assigned corresponding timestamps such that the plurality of waypoints is traversed from a start configuration to a goal configuration with a minimum path length of the path;

performing grasp sequence planning generating a grasp sequence based on a first type of grasp sequence planning or a second type of grasp sequence planning, wherein the first type of grasp sequence planning is based on the optimized cost function and minimizing added contact points and/or removed contact points, wherein the second type of grasp sequence planning is based on a deep reinforcement learning (DRL) policy trained based on a reward function, wherein the reward function is based on a first term indicative of the IK error, a second term indicative of the difference between the estimated required wrench and the actual wrench, and a third term indicative of the grasp efficiency; and
implementing the reference object trajectory and the grasp sequence via a robot appendage and one or more actuators.

12. The method for object manipulation of claim 11, comprising receiving an initial object position, a final object position, an initial object orientation, a final object orientation, and a set of grasp candidates.

13. The method for object manipulation of claim 12, comprising calculating a planned object trajectory based on the initial object position, the final object position, the initial object orientation, the final object orientation, and the set of grasp candidates.

14. The method for object manipulation of claim 13, comprising calculating the reference object trajectory based on the planned object trajectory and the set of grasp candidates.

15. The method for object manipulation of claim 11, wherein the object path planning is performed based on a Probabilistic Roadmap (PRM).

16. The method for object manipulation of claim 11, wherein the object trajectory optimization is performed based on piecewise cubic B-splines.

17. A robot for object manipulation, comprising:
a robot appendage;
one or more actuators configured to drive one or more joints of the robot appendage;
a planner performing:
object path planning to determine a first object pose, a second object pose, and an Nth object pose;
object trajectory optimization by:
assigning a set of timestamps to the first object pose, the second object pose, and the Nth object pose;
optimizing a cost function based on a first factor indicative of an inverse kinematic (IK) error, a second factor indicative of a difference between an estimated required wrench and an actual wrench, and a third factor indicative of a grasp efficiency; and
generating a reference object trajectory based on the optimized cost function, wherein
the planner uses a path length of a path of a planned object trajectory as the cost function to be minimized and the reference object trajectory is based on the planned object trajectory, and
the path of the planned object trajectory includes a plurality of waypoints representing the first object pose, the second object pose, and the Nth object pose at the assigned corresponding timestamps such that the plurality of waypoints is traversed from a start configuration to a goal configuration with a minimum path length of the path; and grasp sequence planning generating a grasp sequence by a first type of grasp sequence planning or a second type of grasp sequence planning,
  wherein the first type of grasp sequence planning is based on the optimized cost function and minimizing added contact points and/or removed contact points,
  wherein the second type of grasp sequence planning is based on a deep reinforcement learning (DRL) policy trained based on a reward function, wherein the reward function is based on a first term indicative of the IK error, a second term indicative of the difference between the estimated required wrench and the actual wrench, and a third term indicative of the grasp efficiency; and
a controller, implementing the reference object trajectory and the grasp sequence via the robot appendage and one or more of the actuators.

18. The robot for object manipulation of claim 17, wherein the object path planning is performed based on a Probabilistic Roadmap (PRM).

19. The robot for object manipulation of claim 17, wherein the object trajectory optimization is performed based on piecewise cubic B-splines.

20. The robot for object manipulation of claim 17, wherein the second type of grasp sequence planning does not require a final grasp to generate the grasp.

* * * * *